United States Patent [19]

Vasilevskis et al.

[11] Patent Number: 4,847,421

[45] Date of Patent: Jul. 11, 1989

[54] PALLADIUM-NITRILE LIGAND CATALYST SYSTEM AND OXIDATION PROCESSES

[75] Inventors: Janis Vasilevskis, Los Gatos; Paul L. Ridgway; Eric R. Evitt, both of Mountain View, all of Calif.

[73] Assignee: Catalytica, Associates, Mountain View, Calif.

[21] Appl. No.: 149,839

[22] Filed: Jan. 29, 1988

Related U.S. Application Data

[60] Division of Ser. No. 89,008, Aug. 21, 1987, Pat. No. 4,738,943, which is a continuation of Ser. No. 826,078, Feb. 4, 1986, abandoned.

[51] Int. Cl.$^4$ ............................................. C07C 45/34
[52] U.S. Cl. .................................. 568/401; 568/399; 568/360; 568/320
[58] Field of Search ................ 568/401, 399, 300, 320

[56] References Cited

U.S. PATENT DOCUMENTS

| | | | |
|---|---|---|---|
| 3,850,980 | 11/1974 | Clark et al. | 568/401 |
| 4,155,879 | 5/1979 | Mirmoun et al. | 568/401 |
| 4,605,776 | 8/1986 | Kaniguchi et al. | 568/401 |
| 4,620,038 | 10/1986 | Tanimoto et al. | 568/401 |

*Primary Examiner*—James H. Reamer
*Attorney, Agent, or Firm*—Limbach, Limbach & Sutton

[57] ABSTRACT

A substantially chloride-free palladium oxidation system, comprising a palladium component, a copper component, and a ligand is described. The Wacker system, consisting of palladium and copper chlorides is also improved by the addition of a ligand. The palladium and copper counterion are independently selected from $BF_4^-$, $CF_3COO^-$, $CH_3COO^-$, $SO_4^=$, and $NO_3^-$. The ligand is preferably a nitrile-containing compound.

12 Claims, No Drawings

PALLADIUM-NITRILE LIGAND CATALYST SYSTEM AND OXIDATION PROCESSES

This is a divisional of application Ser. No. 07/089,003 filed Aug. 21, 1987, now U.S. Pat. No. 4,738,943, which is a file wrapper continuation of application Ser. No. 06/826,078 filed Feb. 4, 1986, and now abandoned.

DESCRIPTION

1. Technical Field

This invention relates generally to palladium catalyzed oxidations of various hydrocarbons, and more specifically to catalyst systems containing palladium, copper, and a ligand.

2. Background of the Invention

Palladium catalysts are useful in the oxidation of unsaturated hydrocarbons. Some generalized examples of such reactions are:

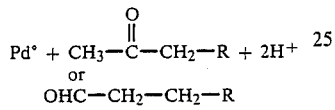

(1) Wacker-type oxidation to carbonyl product

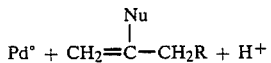

(2) Reaction with a general Nucleophile

In the reactions outlined above, $Pd^{+2}$ is reduced. The overall reaction is made catalytic if the palladium can be reoxidized by an oxidizing agent. Preferentially, one would use plentiful and cheap oxygen from air. The direct reoxidation of palladium by oxygen is thermodynamically possible but kinetically too slow. As a result, a co-catalyst is required to speed up the overall oxidation process.

The Wacker-type oxidation process of the prior art uses $PdCl_2/CuCl_2$ as the catalyst system where $Cu^{+2}$ plays the role of the co-catalyst for palladium reoxidation.

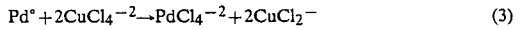

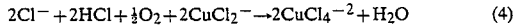

It should be noted that the copper is necessary to improve palladium reoxidation kinetics. Chloride ($Cl^-$) is an essential ingredient since as a $Pd^{+2}$ ligand, it provides a driving force for reaction (3) and, as a $Cu^{+2}$ ligand, it makes reaction (4) thermodynamically favorable.

The above Wacker system, however, presents several substantial engineering problems making commercial application difficult. High chloride concentrations result in severe corrosion, requiring the use of expensive, i.e. titanium clad, reactor vessels. Further, the presence of chloride ions results in the formation of undesirable chlorinated byproducts which lowers the overall yield of desired material. In addition, these chlorinated byproducts often prove difficult to separate from the desired product.

In response to these unfavorable characteristics of Wacker-type catalysts, new systems have been developed by others to reduce the level of chloride present in the olefin oxidation. Examples of the use of polyoxoanions to reduce chloride levels in these types of systems may be found in Belgian Pat. No. 828,603, the work of Ogawa et. al., J.C.S. Chem. Comm., 1274-75 (1981), and U.S. Pat. No. 4,434,082.

Another approach to the problems presented by the Wacker systems has been to increase oxidation kinetics so lower temperatures and lower pressures can be employed, mitigating to a certain extent the harsh conditions of Wacker systems. In U.S. Pat. No. 4,521,631, it is disclosed that a stable oxygen complex of Cu(I)Cl with hexamethylphosphoramide (hmpa) can be formed:

These oxygen complexes are extremely stable. It is further disclosed that the palladium compound can be separately complexed with the olefin, in this instance, ethylene, to form a second complex:

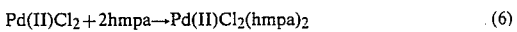

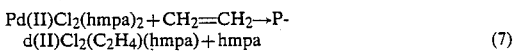

The process disclosed is complete when the ethylene, coordinated with the Pd(II) complex, is oxidized with the combined oxygen contained in the oxygen complex, under mild conditions, to produce acetaldehyde. The process is accomplished in two steps. First, oxygen is passed through the reactants to form the oxygen complex. The system is then heated to remove excess oxygen. In the second step, ethylene is introduced and passed through the oxygen complex. The ethylene-palladium complex forms and is oxidized by the oxygen complex at nearly room temperature to obtain acetaldehyde.

While the above described system may affect a reduction in corrosion of equipment and by-product formation which result from chlorides, the process is complex, requiring two distinct processing steps. The instant invention teaches a way to accomplish similar reactions, chloride-free, in a simple one step process. It is therefore an object of this invention to provide a process for olefin oxidation, as well as general nucleophilic addition, which eliminates the chlorides of Wacker systems while retaining commercially acceptable levels of substrate conversion and product selectivity.

It is a further object of this invention to provide a process in which substrate oxidation can be accomplished in a single step.

It is a further object of this invention to provide a palladium catalyst and its reoxidation system which is simple and inexpensive.

It is another object of this invention to provide an improved Wacker system wherein the addition of the ligand component greatly improves conversion and selectivity.

These and other advantages will be made apparent to those skilled in the art from the specifications and claims which follow.

SUMMARY OF THE INVENTION

The present invention consists of a palladium catalyst system which is comprised of $PdX_2$ and $CuY_2$ and a ligand L for the palladium and(or) copper. In a similar, but not necessarily identical manner to chloride in the prior art Wacker system, the ligand provides the desired thermodynamics and kinetics to make the total oxidation system functional. In one embodiment, a nitrile containing ligand improves the performance of the Wacker chloride system.

X and Y are selected independently from the group consisting of $BF_4^-$, $CF_3COO^-$, $CH_3COO^-$, $SO_4^=$ and $NO_3^-$. The ligand is chosen from the group of compounds containing nitrile functionality. Further, a polar solvent, in which the catalyst system is soluble and which itself does not oxidize appreciably, is used as the oxidation medium for the olefin, or more generally, for the nucleophilic addition. The ligand can serve as a reaction medium.

Chloride ion is not required. In the preferred embodiment, the palladium and copper compounds should be substantially chloride-free.

DETAILED DESCRIPTION OF THE INVENTION

It has been previously recognized that the major rate limitation in the palladium-catalyzed oxidation of olefins is the reoxidation of palladium with a cheap reoxidant like air or oxygen.

An example is shown in equation (8).

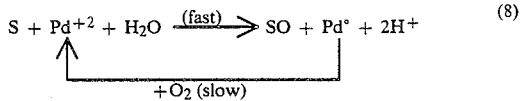

(8)

The prior art Wacker system addresses the critical palladium reoxidation limitation by the use of $Cu^{+2}$ and large amounts of chloride. Equations 3 and 4 are described above in the Background of the Invention.

$$Pd^\circ + 2CuCl_4^{-2} \longrightarrow PdCl_4^{-2} + 2CuCl_2^- \quad (3)$$

$$2Cl^- + 2HCl + \tfrac{1}{2}O_2 + 2CuCl_2^- \longrightarrow 2CuCl_4^{-2} + H_2O \quad (4)$$

$$Pd^\circ + 2Cl^- + 2HCl + \tfrac{1}{2}O_2 \longrightarrow PdCl_4^{-2} + H_2O \quad (9)$$

In the Wacker system the chloride ion is a counterion for both palladium and copper and, at the same time, a ligand. These interactions provide the driving force for reactions (3) and (4). Furthermore, it was thought that $Cl^-$ was also unique in that it could provide a pathway for electron transfer by bridging between copper and palladium.

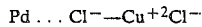

The instant invention, for the first time, shows that other classes of ligand can be substituted for $Cl^-$ while providing an efficient oxidation system. One such class of ligands is the nitriles. The reaction scheme shown below depicts but one way in which these ligands might operate in the instant catalytic oxidation. S is used to represent the substrate.

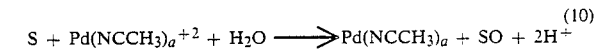

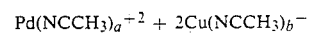

The overall transformation [equation (13)] is simple while the actual catalytic cycle can be quite complex [equations (10) to (12)]. Thus, there exists a delicate balance between the various transformations which can change depending on the anion(s), the nitrile(s) and specific reaction conditions, e.g. pH, $O_2$ pressure, etc.

A. Catalyst System

The catalyst system of the present invention comprises a palladium component, a copper component and at least one ligand component for the palladium and(or) copper. All three components must be present to generate a catalytic oxidation system. While eliminating chlorides from all components is preferred, it is to be understood by those skilled in the art that chlorides may enter the system as contaminants or artifacts of previous syntheses of the catalyst components. Further, it is recognized that the addition of a nitrile ligand to the Wacker system achieves surprising and unexpected improvements in conversion and selectivity. Thus, while the preferred embodiments of the present invention refer to substantially chloride-free catalyst systems which term is used to indicate the possible presence of chloride only as a contaminant, the use of nitrile-ligands with Wacker type catalyst systems, containing chloride, is intended to be within the scope of the claims.

(1) Palladium Component

In the preferred embodiment, any substantially chloride-free palladium containing material, or mixtures thereof, which are suitable in catalytic oxidations, can be used in the catalyst system of the present invention. Finely divided palladium powder, palladium metal, and substantially chloride-free palladium compounds are all useful in the present invention, either individually or in combination. If palladium compounds are used, the type of palladium counterion employed is important. Electron-withdrawing-counterions make palladium a more potent oxidant. Weakly-bonded-counterions allow the ligand(s) of the catalyst to interact with the palladium. It is conceivable that, in some cases, the counterion can also serve the function of the ligand. The preferred palladium compounds are palladium tetrafluoroborate, $Pd(BF_4)_2$; palladium trifluoroacetate, $Pd(CF_3COO)_2$; palladium sulfate, $PdSO_4$; palladium acetate, $Pd(CH_3COO)_2$; and palladium nitrate, $Pd(NO_3)_2$.

(2) Copper Component

In the preferred embodiment, any substantially chloride-free copper containing material, or mixtures thereof, can be used in the catalyst system of the present invention. Copper metal, cuprous or cupric salts, and even copper of higher oxidation states, can be used as the starting point of the copper component. The type of copper counterion employed is also important. It must not interfere with the palladium oxidation chemistry or with the positive effect of the ligand(s) of the system. In some cases, the counterion might also serve as the ligand. Preferred copper compounds are copper tetrafluoroborate, copper trifluoroacetate, copper sulfate, copper acetate, and copper nitrate.

(3) Ligand(s)

The ligand(s) can be selected to complex palladium and(or) the copper compounds. Their function is to provide favorable thermodynamics and kinetics for the oxidation process. One such class of ligands which is useful in the instant invention is the nitriles (RC≡N) where R is selected from a great variety of substituents. One is also not limited to mononitriles. The preferred ligand is acetonitrile, where R is equal to $CH_3$. R can by any other group that does not interfere with the palladium and copper chemistry and does not affect adversely the properties of the catalyst system. R can be a hydrocarbon or a derivatized hydrocarbon. Non-exhaustive examples are R:

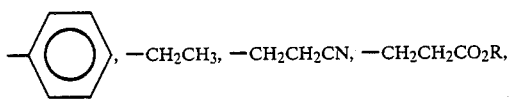, $-CH_2CH_3$, $-CH_2CH_2CN$, $-CH_2CH_2CO_2R$,

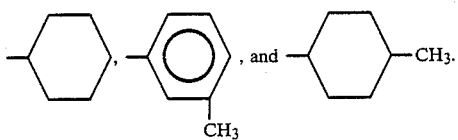

While the preferred embodiment has been described with reference to substantially chloride-free components, the addition of nitrile-ligand components to the chloride-containing Wacker system is specifically intended to be within the scope of this invention and appended claims.

B. Hydrocarbon Oxidation Process

In addition to the previously described utility of the instant oxidation catalyst system in the oxidation of olefins to ketones, it is also useful in any other hydrocarbon oxidation in which palladium changes its oxidation state, e.g. $Pd^{+2} \rightarrow Pd^\circ$, $Pd^{+4} \rightarrow Pd^{+2}$. A generalized example involving a hydrocarbon RH and an organic nucleophile NuH is represented by Equation (14).

$$RH + NuH + Pd^{+n} \rightarrow RNu + Pd^{+n-2} + 2H^+ \quad (14)$$

Specific examples of these types of reactions, involving oxidative carbonylation and a coupling reaction, are shown in Equations (15) and (16), respectively. However, other known hydrocarbon oxidation reactions are intended to be within the scope of the appended claims.

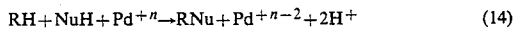 (15)

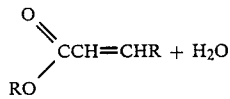

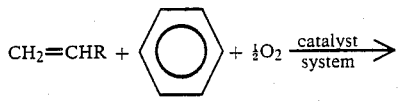 (16)

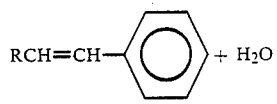

(1) Hydrocarbon Substrate

Any hydrocarbon capable of being oxidized by palladium is a substrate for the catalyst system of the instant invention. Specific, nonlimiting examples of such hydrocarbons are olefins, substituted olefins, aromatics and substituted aromatics.

(2) Nucleophiles

A large variety of nucleophiles can be employed in the instant invention. They include but are not limited to water, alcohols, amines, and nucleophilic hydrocarbons, e.g. $CH_2(CO_2R)_2$.

(3) Solvent

The polar solvent of the instant invention is selected to dissolve the catalyst components (copper and palladium salts). The range of polar solvents which are available is indeed quite large, including, but not limited to ketones, alcohols, acids, and aqueous systems. The preferred solvents of the instant invention are water, acetone and propylene carbonate. In some cases the ligand, e.g. acetonitrile, can itself be the preferred solvent.

(4) Acid

Since the various steps involved in the overall oxidation are acid dependent, the acidity, i.e., pH, has to be adjusted for maximum performance. Various proton sources such as $HBF_4$, $CF_3COOH$, $CH_3COOH$, $HNO_3$ or $H_2SO_4$ can be used. It is preferred to use the acid having the same anion as the copper component of the catalyst system.

(5) Oxygen

Depending on the process one can use either air or oxygen. Other known sources of oxygen are acceptable but would be less economical. Similarly, other known oxidants would be acceptable but are anticipated to be less economical.

(6) Process Conditions

The oxidation temperatures are typically between 20° C. and 200° C., preferably 45°–90° C. At lower temperatures, the rate of oxidation becomes too slow. At higher temperatures, overoxidation can be a problem. If the ligand of the catalyst system is a nitrile, then the upper temperature limit (which depends on the pH and amount of water present) may depend upon where nitrile hydrolysis to an amide begins.

The operating pressure for the oxidation is typically between 0–200 psig. At lower pressures, the rate of oxidation can be too slow, while at higher pressures the risks of overoxidation and explosion increase.

The acidity of the liquid phase has to be controlled for maximum oxidation activity and selectivity to the desired product. It has to be adjusted on a case-by-case basis.

The ratio of palladium to copper can vary between 1/1 to 1/500 depending on how efficiently the copper catalyst reoxidizes the palladium catalyst. The slower the reoxidation, the more copper is required. A preferred ratio of palladium to copper is in the range of 1/5 to 1/50 depending on the counterion that is used.

The amount of ligand present can vary from molar amounts equivalent to the palladium and(or) copper molar amounts to a large excess, i.e., solvent for the reaction. In the case of acetonitrile, oxidation proceeds well when the nitrile represents 10–20% of the total solvent. In general one would like to use the minimum amount of nitrile necessary to get the desired reaction rate because this reduces the cost of the catalyst system and increases the ease of separation of the catalyst and the product.

Reaction times vary from a few minutes to 48 hours. Short reaction times can lead to heat management problems while long reaction times lead to economically unattractive large reactor sizes.

This invention can be more fully understood by reference to the following examples.

In all the oxidations that are described in the following examples I-XXI, the reaction vessel utilized was either (a) an 80 ml Fischer-Porter ® (Fischer-Porter Co., Warminster, Pa.) bottle having a magnetic stirrer capable of 250 rpm (hereinafter referred to as R1), (b) an 80 ml Fischer-Porter ® bottle with a motor driven titanium paddle stirrer (1750 rpm) (hereinafter referred to as R2), or (c) a 100 ml Fluitron SS316 reactor (5000 psi rating) with a conventional stirrer (2500 rpm maximum) (hereinafter referred to as R3). The observed relative oxidation rates, because of increased mass transport of oxygen and (or) olefin, can increase substantially in going from R1→R2→R3.

R1's were fitted with a pressure gage, oxygen inlet line, vent line, and a liquid injection port through which liquid (e.g., olefin) could be injected at any desired operating temperature and pressure. Each R1 used a 3" long, 1½" diameter Teflon ® (DuPont Co., Wilmington, Del.) coated stirring bar. The oxygen lines to the reactors were fitted with filters and check valves. The R1's were heated in a glycol bath whose temperature was controlled by a I²R Thermo-Watch. Each bath was protected from inadvertent overheating by an I²R Over-Temp Probe.

R2's were outfitted in a similar fashion as the R1's, the major difference being the mode of stirring, i.e., the motor driven two blade paddle stirrer. Both the stirrer shaft and paddle were made of titanium so that comparison runs using corrosive concentrations of chloride could be carried out.

R3 was a 100 ml reactor manufactured by Fluitron Inc. of Warminster, Pa. The double disk six pitched blade stirrer was originally designed to circulate the catalyst solution out of and into the reactor so that the reactor need not be depressurized for sampling. R3 was heated by an electrical heater. The temperature was monitored by a thermocouple. The temperature was set using a RI Instruments controller and was monitored on an Analog Devices Digital Thermometer. A Watlow over-heat monitor was used to shut off the whole system. Representative samples could be taken using a pressure syringe while R3 was in full operation.

All reactors were first loaded with the solvent followed by addition of the various catalyst components. The reactor was sealed and pressurized/depressurized at least four times with oxygen. The final pressure was left at 80 psig. The reactor was then heated to the reaction temperature. The olefin was injected using a pressure syringe without the need for depressurizing. Oxygen could be supplied by repressurizing as the pressure fell or by leaving the oxygen supply line open to a constant pressure source of the gas.

In R1 and R2 oxidation runs, samples could not be obtained during a run. In R3 reactions, uniform samples could be obtained as a function of time.

After the desired reaction time, the reactors were quenched to room temperature and were depressurized. One phase solutions could be analyzed directly by GC. The reactions using water required extraction of the products before GC analysis could be performed.

In the following examples, "conversion" is defined as the moles of olefin reacted per mole of olefin fed; "selectivity" is defined as the moles of ketone produced per mole of olefin reacted; "yield" is defined as the product of selectivity and conversion; and "turnover per Pd" is defined as the moles of ketone produced per mole of Pd present in the system.

C. WORKING EXAMPLES

Examples I to IV

A series of 1-hexene oxidations were carried out using various nitrile-polar solvent mixtures. Table 1 lists the reaction conditions and the results. These oxidation runs demonstrate that the catalyst systems of the instant invention can be used in a variety of nitrile-polar solvent combinations. The results further demonstrate that one can obtain high conversions of olefin with good selectivity to either a mixture of ketones (2- and 3-hexanone) or pure ketone (2-hexanone). It should be noted that in the initial stages of the reaction, the main side products are isomers of 1-hexene, i.e., 2- and 3-hexene which, with time, are converted to a mixture of 2- and 3-hexanone. Thus if the reactions are run to full conversion, one gets very high yields of ketone product.

EXAMPLES V to X

A series of 1-hexene oxidations were carried out using various ratios of polar solvent to nitrile.

Example V did not use a nitrile ligand. One observes a single turnover on palladium, i.e., the palladium did not reoxidize and no further product was formed. In Examples VI to X, catalytic activity persisted until all of the olefin (1-, 2-, and 3-hexene) was oxidized to ketones (see footnote 3 in Table 2).

The oxidation runs in Table 2 demonstrate that a ligand is needed for catalytic oxidation. Further, these runs demonstrate that various ratios of ligand to solvent are effective as is the ligand when it is used as a solvent.

Examples XI to XXI

A series of 1-hexene oxidations were carried out using various counterions for the palladium and copper components of the catalyst. Table 3 lists the reaction conditions and the results.

These oxidation runs demonstrate that a large variety of counterions or counterion mixtures can be useful in the instant catalyst system. High conversion of 1-hexene to high yields of 2-hexanone or ketones (2- and 3-hexanone) can be obtained. The anion can be used to control the composition of the final product.

Table 3, Example XIX–XXI, further illustrates that the addition of a ligand, specifically acetonitrile, improves the results obtained in conventional Wacker systems. Common values for conversion and selectivity in the Wacker system without a ligand are 57.4 and 61.3. With acetonitrile present as a ligand these values increase to 94.3 and 85.1, respectively.

TABLE 1

Oxidation of 1-Hexene in Various Nitrile/Solvent Systems

Examples I to IV

| Run # | Reactor | Solvent | Ratio of Solvent CH$_3$CN | Pd$^{+2}$ Anion | Wt. (gm) | Cu$^{+2}$ Anion | Wt. (gm) | % Conversion of 1-Hexene | % Selectivity to Ketones | % Selectivity to 2-Hexanone | Turnovers per Pd per min. (2-Hexanone) |
|---|---|---|---|---|---|---|---|---|---|---|---|
| I | R2 | H$_2$O | 9 | CF$_3$COO$^-$ | 0.05 | SO$_4^=$ | 4.5 | 77.1 | 90.4 | 89.9 | 0.61 |
| II | R1 |  | 9 | CF$_3$COO$^-$ | 0.281 | BF$_4^-$ | 1.227 | 100 | 73.9 | 45.4 | — |
| III | R1 | 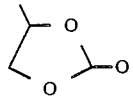 | 9 | CF$_3$COO$^-$ | 0.281 | BF$_4^-$ | 1.227 | 100 | 89.4 | 50.4 | — |
| IV | R1 |  | 9 | CF$_3$COO$^-$ | 0.281 | BF$_4^-$ | 1.227 | 100 | 15.6 | 10.1 | — |

Reaction Conditions

| Run # | Reactor | T (°C.) | P (O$_2$) (psi) gage | Time (hr) | RCN + Solvent (ml) | RCN R= | Olefin (ml) | RPM |
|---|---|---|---|---|---|---|---|---|
| I | R2 | 85 | 85 | 2 | 16.5 | CH$_3$ | 2 | 1750 |
| II | R1 | 60 | 85 | 5 | 30 | CH$_3$ | 2 | 250 |
| III | R1 | 60 | 85 | 5.25 | 30 | CH$_3$ | 2 | 250 |
| IV | R1 | 61 | 80 | 5 | 30 | φ | 2 | 250 |

TABLE 2

Oxidation of 1-Hexene as a Function of Acetonitrile Concentration[1]

| Examples V to X Run # | O$^2$ ‖ CH$_3$CN | Pd$^{+2}$ Anion | Wt. (gm) | Cu$^{+2}$ Anion | Wt. (gm) | Time (hr) | % Conversion of 1-Hexene | % Selectivity to 2-Hexanone | % Selectivity[3] to Ketones |
|---|---|---|---|---|---|---|---|---|---|
| V | 00[4] | CF$_3$COO$^-$ | .281 | BF$_4^-$ | 1.227 | 8 | 99.0 | 5.3 | 5.3 |
| VI | 99 | CF$_3$COO$^-$ | .281 | BF$_4^-$ | 1.227 | 4 | 98.8 | 8.7 | 13.6 |
| VII | 19 | CF$_3$COO$^-$ | .281 | BF$_4^-$ | 1.227 | 4 | 100 | 28.7 | 46.6 |
| VIII | 9 | CF$_3$COO$^-$ | .281 | BF$_4^-$ | 1.227 | 4 | 96.7 | 39.8 | 64.2 |
| IX | 4 | CF$_3$COO$^-$ | .281 | BF$_4^-$ | 1.227 | 6.5 | 100 | 49.1 | 80.1 |
| X | 0[5] | CF$_3$COO$^-$ | .281 | BF$_4^-$ | 1.227 | 8 | 100 | 53.4 | 91.2 |

[1]Reaction conditions: 60° C., 80 psi O$_2$ (gage), 30 ml volume of solvents, 2 ml olefin.
[2]Volume ratio.
[3]At this point, most of the other products are internal olefins which continue to oxidize. At longer reaction times, the final selectivity to 2- and 3-hexanone is between 92% and 98%. Does not apply to example V.
[4]No acetonitrile was present - only acetone.
[5]No acetone was present - only acetonitrile.

TABLE 3

Oxidation of 1-Hexene as a Function of the Palladium and Copper Counterions

Examples XI to XXI

| Run # | Reactor | Pd$^{+2}$ Anion | Wt. (gm) | Cu$^{+2}$ Anion | Wt. (gm) | Time (hr) | % Conversion of 1-Hexene | % Selectivity to 2-Hexanone | % Selectivity to Ketones |
|---|---|---|---|---|---|---|---|---|---|
| XI | R1 | BF$_4^-$ | .375 | BF$_4^-$ | 1.227 | 4.75 | 100 | 52.2 | 88.2 |
| XII | R1 | CF$_3$COO$^-$ | .281 | BF$_4^-$ | 1.227 | 5 | 100 | 45.9 | 74.8 |
| XIII | R1 | CF$_3$COO$^-$ | .281 | CF$_3$COO$^-$ | 1.018 | 8 | 100 | 40.0 | 42.1 |
| XIV | R2 | CF$_3$COO$^-$ | .050 | SO$_4^=$ | 4.50 | 1 | 77.1 | 89.9 | 90.4 |
| XV | R3 | CF$_3$COO$^-$ | .121 | SO$_4^=$ | 10.9 | 1 | 97.8 | 70.1 | 70.1 |
| XVI | R2 | CH$_3$COO$^-$ | .250 | CH$_3$COO$^-$ | 2.25 | 5.7 | 95.5 | 93.1 | 93.1 |
| XVII | R2 | SO$_4^=$ | .126 | SO$_4^=$ | 4.50 | 1 | 82.4 | 95.8 | 96.1 |
| XVIII | R1 | NO$_3^-$ | .240 | NO$_3^-$ | 0.817 | 2 | 100 | 12.3 | 15.4 |
| XIX | R1 | Cl$^-$ | .150 | Cl$^-$ | 0.600 | 2.5 | 100 | 89.2 | 89.2 |
| XX | R1 | Cl$^-$ | .150 | Cl$^-$ | 0.600 | 1 | 94.3 | 85.1 | 85.1 |
| XXI | R1 | Cl$^-$ | .150 | Cl$^-$ | 0.600 | 1 | 57.4 | 61.3 | 61.3 |

Reaction Conditions

| Run # | Reactor | T (°C.) | P (O$_2$) (psi) gage | Time (hr) | Solvents | Solvent Ratio | Total Vol. (ml) | Olefin (ml) | RPM |
|---|---|---|---|---|---|---|---|---|---|

TABLE 3-continued

Oxidation of 1-Hexene as a Function of the Palladium and Copper Counterions

| | | | | | | | | | |
|---|---|---|---|---|---|---|---|---|---|
| XI | R1 | 60 | 85 | 4.75 | acetone/$CH_3CN$ | 9/1 | 30 | 2.0 | 250 |
| XII | R1 | 60 | 80 | 5.0 | acetone/$CH_3CN$ | 9/1 | 30 | 2.0 | 250 |
| XIII | R1 | 60 | 80 | 8.0 | acetone/$CH_3CN$ | 9/1 | 30 | 2.0 | 250 |
| XIV | R2 | 85 | 85 | 0.67 | $H_2O/CH_3CN$ | 10.7/1 | 16 | 2.0 | 1750 |
| XV | R3 | 85 | 85 | 1.9 | $H_2O/CH_3CN$ | 10/1 | 40 | 4.8 | 2000 |
| XVI | R2 | 62 85 | 85 | 2.5 3.2 | $H_2O/CH_3CN$ | 4/1 | 16.5 | 2.0 | 1000 |
| XVII | R2 | 87 | 85 | 1.0 | $H_2O/CH_3CN$ | 10.7/1 | 16 | 2.0 | 1750 |
| XVIII | R1 | 58 | 85 | 2.0 | acetone/$CH_3CN$ | 9/1 | 30 | 2.0 | 250 |
| XIX | R1 | 60 | 85 | 2.5 | acetone/$CH_3CN$ | 19/1 | 30 | 2.0 | 250 |
| XX | R1 | 60 | 85 | 1.0 | acetone/$CH_3CN$ | 19/1 | 16.5 | 2.0 | 250 |
| XXI | R1 | 60 | 85 | 1.0 | acetone | ∞ | 16.5 | 2.0 | 250 |

We claim:

1. A process for the oxidation of a hydrocarbon substrate to obtain an oxidation product which comprises the steps of contacting said hydrocarbon substrate with an unsupported, dissolved catalyst system which comprises palladium chloride components, copper components and a nitrile ligand in the presence of oxygen, and separating the oxidation product from said catalyst system.

2. A process for olefin oxidation which comprises the steps of contacting said olefin with an unsupported, dissolved catalyst system which comprises palladium chloride components, copper components and a nitrile ligand in the presence of oxygen, and separating the oxidation product from said catalyst system.

3. A process for olefin oxidation to ketones which comprises the steps of contacting said olefin with an unsupported, dissolved catalyst system which comprises palladium chloride components, copper components and a nitrile ligand in the presence of oxygen, and separating the oxidation product from said catalyst system.

4. A process for the oxidation of a hydrocarbon substrate to obtain an oxidation product which comprises the steps of contacting said hydrocarbon substrate with a substantially chloride-free, unsupported, dissolved catalyst system which comprises palladium components, copper components and a nitrile ligand in the presence of oxygen, and separating the oxidation product from said catalyst system.

5. A process for olefin oxidation which comprises the steps of contacting said olefin with a substantially chloride-free, unsupported, dissolved catalyst system which comprises palladium components, copper components and a nitrile ligand in the presence of oxygen, and separating the oxidation product from said catalyst system.

6. A process for olefin oxidation to ketones which comprises the steps of contacting said olefin with a substantially unsupported, dissolved catalyst system which comprises palladium components, copper components and a nitrile ligand in the presence of oxygen, and separating the oxidation product from said catalyst system.

7. A process according to claims 4, 5 or 6 wherein the palladium component is a palladium salt, $PdX_2$, the copper component is a copper salt, $CuY_2$, wherein X and Y are counterions independently selected from the group of counterions consisting of $BF_4^-$, $CF_3COO^-$, $CH_3COO^-$, $SO_4^=$, and $NO_3^-$.

8. A process according to claims 4, 5 or 6 wherein the palladium component is $Pd(BF_4)_2$, the copper component is $Cu(BF_4)_2$ and the ligand is acetonitrile.

9. A process according to claims 4, 5 or 6 wherein the palladium component is $Pd(CF_3COO)_2$, the copper component is $Cu(CF_3COO)_2$ and the ligand is acetonitrile.

10. A process according to claims 4, 5 or 6 wherein the palladium component is $Pd(CH_3COO)_2$, the copper component is $Cu(CH_3COO)_2$ and the ligand is acetonitrile.

11. A process according to claims 4, 5 or 6 wherein the palladium component is $Pd(SO_4)$, the copper component is $Cu(SO_4)$ and the ligand is acetonitrile.

12. A process according to claims 4, 5 or 6 wherein the palladium component is $Pd(NO_3)_2$, the copper component is $Cu(NO_3)_2$ and the ligand is acetonitrile.

* * * * *